(12) United States Patent
Nishio (10) Patent No.: US 7,809,787 B2
(45) Date of Patent: Oct. 5, 2010

(54) SERVICE PROVIDING APPARATUS, SERVICE PROVIDING METHOD, AND CONTROL PROGRAM

(75) Inventor: Masahiro Nishio, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 546 days.

(21) Appl. No.: 11/569,521

(22) PCT Filed: Jun. 10, 2005

(86) PCT No.: PCT/JP2005/011101

§ 371 (c)(1),
(2), (4) Date: Nov. 22, 2006

(87) PCT Pub. No.: WO2005/121952

PCT Pub. Date: Dec. 22, 2005

(65) Prior Publication Data

US 2007/0226352 A1    Sep. 27, 2007

(30) Foreign Application Priority Data

Jun. 11, 2004 (JP) .............................. 2004-174521

(51) Int. Cl.
G06F 15/16 (2006.01)

(52) U.S. Cl. .................... 709/203; 709/202; 709/227; 709/246; 358/400

(58) Field of Classification Search .................. 709/227, 709/226, 202, 246, 203; 358/400; 379/100.01, 379/100.13
See application file for complete search history.

(56) References Cited

U.S. PATENT DOCUMENTS

| | | | | |
|---|---|---|---|---|
| 5,559,933 A | * | 9/1996 | Boswell | 358/1.15 |
| 6,219,151 B1 | * | 4/2001 | Manglapus et al. | 358/1.15 |
| 6,292,267 B1 | * | 9/2001 | Mori et al. | 358/1.15 |
| 6,424,980 B1 | * | 7/2002 | Iizuka et al. | 715/206 |
| 7,177,043 B2 | * | 2/2007 | Qiao, Jingyu | 358/1.15 |
| 2002/0029256 A1 | * | 3/2002 | Zintel et al. | 709/218 |
| 2002/0078160 A1 | * | 6/2002 | Kemp et al. | 709/208 |
| 2002/0078161 A1 | * | 6/2002 | Cheng | 709/208 |
| 2002/0080391 A1 | * | 6/2002 | Sugiura et al. | 358/1.15 |
| 2002/0083143 A1 | | 6/2002 | Cheng | 709/208 |
| 2002/0093681 A1 | * | 7/2002 | Hitaka | 358/1.15 |
| 2002/0112058 A1 | | 8/2002 | Weisman et al. | 709/227 |
| 2003/0137693 A1 | * | 7/2003 | Nishio | 358/1.15 |
| 2003/0140344 A1 | | 7/2003 | Bhatti | 725/62 |

OTHER PUBLICATIONS

A. Ankolekar et al., "DAML-S: Web Service description for the Semantic Web", *Lecture Notes in Computer Science*, Springer Verlag, N.Y, U.S.A., vol. 2342, Jun. 9, 2002 pp. 348-363, XP002276131; ISSN: 0302-9743.

W. Yamazaki et al., "Deisgn of Collaborative Agent System with Access Control for Smart-Office Environment", IEEE 2001, pp. 205-210.

* cited by examiner

*Primary Examiner*—Nathan Flynn
*Assistant Examiner*—Aftab Nasir Khan
(74) *Attorney, Agent, or Firm*—Fitzpatrick, Cella, Harper & Scinto (57) ABSTRACT

A service providing apparatus has an obtaining unit that obtains specific information to specify a service of which the apparatus has been notified by a client device, and a response unit that outputs response information on the basis of whether or not the service specified by the obtained specific information can be provided.

19 Claims, 5 Drawing Sheets

```
M-SEARCH *HTTP/1.1
HOST:239.255.255.250:1900  ~301
MAN:"ssdp:discover"
MAX:60
ST:urn:schema-upn-org:service:PrintBasic:1  ~302

<s:Envelope
    xmlns:s="http://schemas.xmlsoap.org/soap/envelope/"
    s:encodingStyle="http://schemas.xmlsoap.org/soap/encoding/">
    <s:Body>
        <ComplexQueryRequest>
            <filtering>TRUE</filtering>  ~303

<descriptionURL>http://www.aaa.com/description</descriptionURL>  ~304
                <responseURL>http:www.bbb.com/response</responseURL>  ~305
        </ComplexQueryRequest>
    </s:Body>
</s:Envelope>
```

FIG. 4

```
<FilteringDescription>  ~401
    <ColorOrBW>COLOR</ColorOrBW>  ~402
    <Resolution>600</Resolution>  ~403
    <Finisher>STAPLE-SORT</Finisher>  ~404
</FilteringDescription>
```

```
POST /response HTTP/1.1
HOST:www.xxx.com
ACCEPT:text/*
Content-type:text/xml
Content-Length:xxxx <s:Envelope
    xmlns:s="http://schemas.xmlsoap.org/soap/envelope/"
    s:encodingStyle="http://schemas.xmlsoap.org/soap/encoding/">
    <s:Body>
        <ComplexQueryResponse>     ~601
            <profileURL>http:www.aaa.com/printer/profile</profileURL>
            <controlURL>http:www.aaa.com/printer/control</controlURL>
        </ComplexQueryResponse>
    </s:Body>
</s:Envelope>
```

SERVICE PROVIDING APPARATUS, SERVICE PROVIDING METHOD, AND CONTROL PROGRAM

TECHNICAL FIELD

The invention relates to a service providing apparatus which provides services according to a service request from a client device on a network, a service providing system having such a service providing apparatus, a service providing method, and its program.

BACKGROUND ART

Hitherto, a service providing apparatus and a service providing system which provide services according to a service request from a client device on a network have been known. For example, in association with the remarkable spread of communication through the Internet, a variety of kinds of apparatuses other than conventional personal computers have been developed as network communicating-type apparatuses. For example, with respect not only to user-interactive devices such as PDA (Personal Digital Assistants), cellular phones, and the like but also image processing apparatuses such as scanners, printers, copying apparatuses, and digital cameras, household appliances such as televisions, air conditioners, and refrigerators, and the like, measures for making those apparatuses capable of communicating via a network are rapidly being taken.

In association with these measures, to improve usability and simplicity upon using those network corresponding type devices, there have been proposed various protocols for providing: automatic setting means of a network address; retrieving/searching means of the network device which provides services; and automatic setup means such as application software, utility software, operating system, or the like for controlling the network corresponding type devices. For example, the following protocols can be mentioned: "UPnP" (registered trademark), which has been developed mainly by Microsoft Corporation; "BMLinks" (Non-Patent Document 1), developed by JBMIA (The Japan Business Machine Information system industrial Association); "Rendezvous", which is supported by "OS X" developed by Apple Computer, Inc.; and the like.

With regard to the retrieving/searching means of the network device, for example, there is an SSDP (Simple Service Discovery Protocol) constructing the "UPnP" (registered trademark) standard mentioned above as means for designating a simple service name such as "print" or "scan" as a searching condition. Means for further adding detailed searching conditions (hereinafter, simply referred to as "detailed retrieving conditions") to the function of the SSDP has been proposed. Specifically speaking, in the case of using "print service" as a searching condition, searching means added with narrowing and limiting conditions of detailed searching conditions which specify that print resolution is equal to 600 dpi, a color output can be performed, a sheet tray corresponds to a sheet size of A3, and the like has further been proposed.

In any of the above cases, the client device executes a process for sending a data packet describing the searching condition (hereinafter, referred to as a search packet) onto the network in order to search for the usable device existing on the network. Thus, each network device receives the search packet. Among the network devices which received the search packet, the network device which satisfies the searching condition included in the search packet transmits response data which responds to the search packet to the client device which issued the search packet.

Refer to "BMLinkS", The Japan Business Machine Information system industrial Association, Internet <URL: http://www.jbmia.or.jp/bmlinks/eng/index.htm>.

However, the method of transmitting the search packet to all of the network devices connected to the network as mentioned above has a problem in that, for example, if the search packet contains a large amount of data including a large amount of searching conditions, the communication load on the network increases and the efficiency of the network process deteriorates.

There is no problem in a case where the searching means as mentioned above is used in, for example, a household LAN (Local Area Network) or a LAN in a small office where there is no possibility of intervention of a malicious third party. However, in a case where an unspecified large number of users use the searching means as mentioned above on the network through an intranet or the Internet, there is a possibility that the searching means may be used illegally by a malicious third party. There is also a problem in that such illegal use can itself affect the network system which provides the services.

For example, in a case where the malicious client frequently issues search packets to which a large amount of searching conditions have been added, naturally, the corresponding increase in volume of traffic on the network results in the service providing apparatus which received the search packet continuing to analyze the contents of the searching conditions, and thus there is a possibility that the device does not function.

On the other hand, in a case where malicious software or device which continues to transmit the response data by pretending to be a network device according to a search request issued by the client is implemented on the network, there is a possibility that the network client cannot function, the contrary to the above case.

DISCLOSURE OF INVENTION

The invention is made in consideration of addressing at least one of the foregoing problems, and it is an object of the invention to provide a service providing system, a service providing method, and its program in which even if a large number of searching conditions are set in order to search for a desired device from among network devices connected to a network, a searching process of the network device can be efficiently executed.

Another object of the invention is to provide a service providing system, a service providing method, and its program in which in a process for searching for a desired device from network devices connected to a network, stability (particularly, performance which can survive an attack from outside) of the network system can be improved.

According to the service providing system, the service providing method, and its program of the invention, even if a large number of searching conditions are set, in order to search for the desired device from the network devices connected to the network, the searching process of the network device can be efficiently executed.

According to the invention, there is provided a service providing apparatus comprising: obtaining means for obtaining specific information to specify a service of which the apparatus is notified by a client device; and response means for outputting response information on the basis of whether or not the service specified by the specific information obtained by the obtaining means can be provided.

Other features and advantages of the present invention will be apparent from the following description taken in conjunction with the accompanying drawings, in which like reference characters designate the same or similar parts throughout the figures thereof.

BEST MODE FOR CARRYING OUT THE INVENTION

A preferred embodiment of the invention will be shown as an example and explained in detail hereinbelow with reference to the drawings. However, protocols, versions, addresses, other numerical values, and the like disclosed in the embodiment do not limit the scope of the present invention only to them unless otherwise specifically described.

The service providing system in the embodiment is a print service providing system and a protocol converting system which is used in this print service providing system will now be described.

Figure 1:
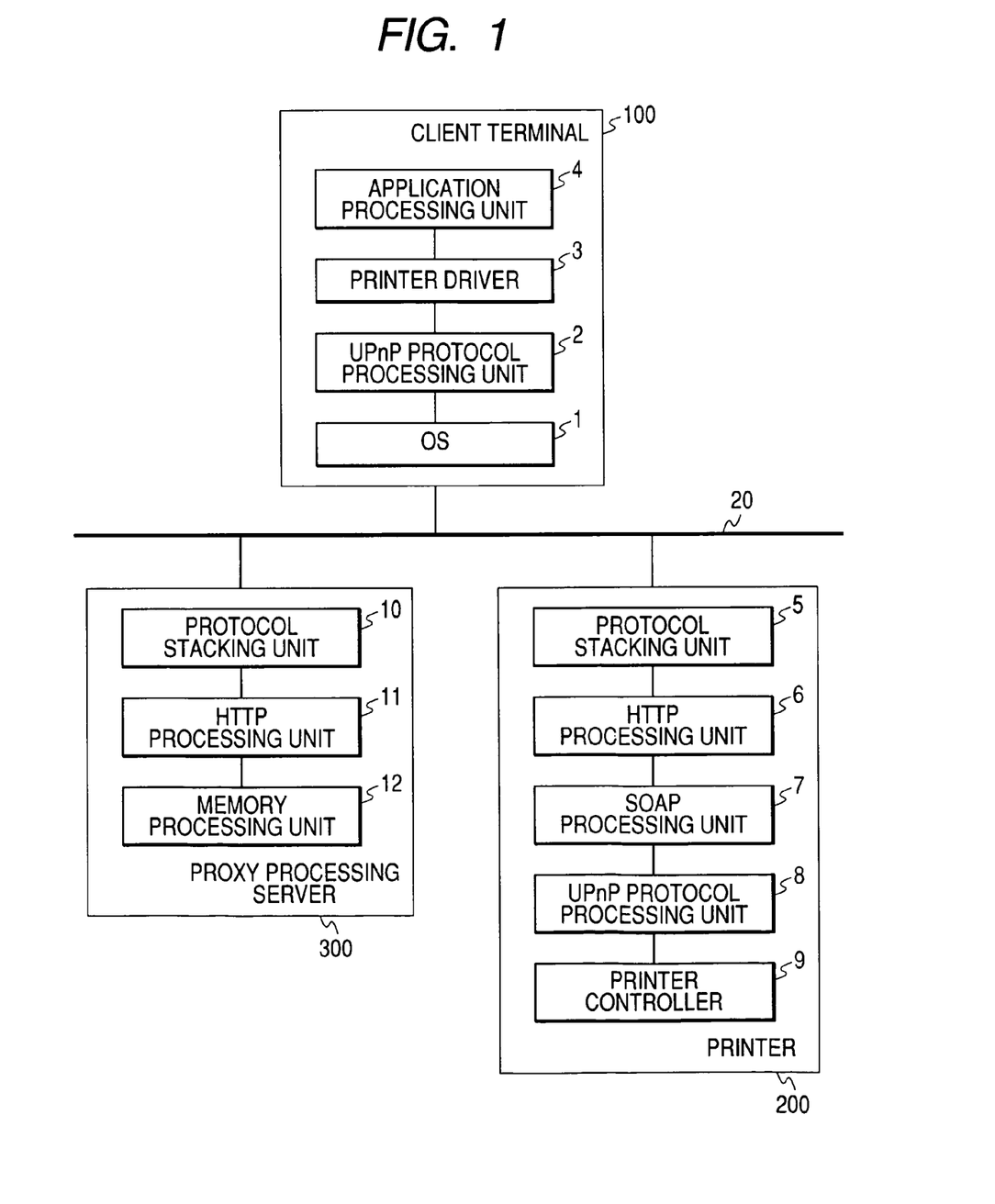
FIG. 1 is a block diagram showing a schematic construction of a print service providing system according to an embodiment of the invention.

FIG. 1 is a block diagram showing a schematic construction of the print service providing system according to the embodiment of the invention.

As shown in FIG. 1, a client 100, a printer 200, and a proxy processing server 300 are connected through a network 20. A general operating system (hereinafter, abbreviated to "OS") such as "Windows" (registered trademark) developed by Microsoft Corporation, "MacOS" developed by Apple Computer, Inc., or the like and general applications which can be executed on the OS have been installed in the client 100. In the present embodiment, as shown in FIG. 1, the client 100 is constructed of an OS 1, a UPnP (registered trademark) protocol processing unit 2, a printer driver 3, and an application processing unit 4.

The UPnP (registered trademark) protocol processing unit 2 can execute discovery, control, obtaining of the status, and the like of devices on the network 20 by a protocol using XML (eXtensible Markup Language)/SOAP (Simple Object Access Protocol). For example, when the application processing unit 4 has a function of a word processor, a document formed by the application processing unit 4 is converted by the printer driver 3 into data which can be print-processed by a printer. After that, through the UPnP (registered trademark) protocol processing unit 2, a print job is issued to the printer on the network 20 corresponding to the UPnP (registered trademark) protocol searched and found by the UPnP (registered trademark) protocol processing unit 2.

The printer 200 is a network correspondence device (network-corresponding-type printer), i.e., it can be used through the network 20. As shown in FIG. 1, the printer 200 has a protocol stacking unit 5 as a communicating function for communication through the network 20. Further, the printer 200 has an HTTP processing unit 6, an SOAP processing unit 7, a UPnP (registered trademark) protocol processing unit 8, and a printer controller 9. The protocol stacking unit 5 has a function of stacking a protocol such as TCP/UDP/IP or the like. The HTTP processing unit 6 is constructed as an upper unit of the protocol stacking unit 5 and executes analysis of an HTTP request and a responding process.

The SOAP processing unit 7 is constructed in an upper layer of the HTTP processing unit 6 and executes analysis of a UPnP (registered trademark) request described by XML-SOAP and a responding process. The UPnP (registered trademark) protocol processing unit 8 executes a searching process, a description process, a control process, and an event process specified by the UPnP (registered trademark) in an upper layer of the SOAP processing unit 7. The UPnP (registered trademark) protocol processing unit 8 has a function of communicating with the printer controller 9, converts each process specified by UPnP (registered trademark) into a communicating procedure peculiar to the printer controller 9, executes the print job, and executes processes for obtaining of the printer status and the like. The printer controller 9 executes a printing process and its control.

The proxy processing server 300 has a protocol stacking unit 10, an HTTP processing unit 11, and a memory processing unit 12. The protocol stacking unit 10 executes a process for stacking the TCP/UDP/IP protocol in order to realize the communicating function through the network 20. The HTTP processing unit 11 is constructed in an upper layer of the protocol stacking unit 10 and executes analysis of the HTTP request and the responding process. The proxy processing server 300 has a recording apparatus (not shown) for recording a searching expression for a condition search and a URL of the service providing apparatus which has made a response to the condition search. Thus, in response to a request notified by the HTTP processing unit 11, the memory processing unit 12 located in the upper layer thereof executes writing/reading processes of the searching expression and writing/reading processes of the URL of the response device to a recording apparatus.

A plurality of printers in which functions which are supported, processing abilities, and the like are different although they have substantially the same construction as that of the network corresponding printer like a printer 200 are connected onto the network 20. Similarly, there can be also such a situation that a plurality of client devices having a construction similar to that of the client device 100 or a plurality of proxy processing servers having a construction similar to that of the proxy processing server 300 are connected to the network 20.

Figure 2:
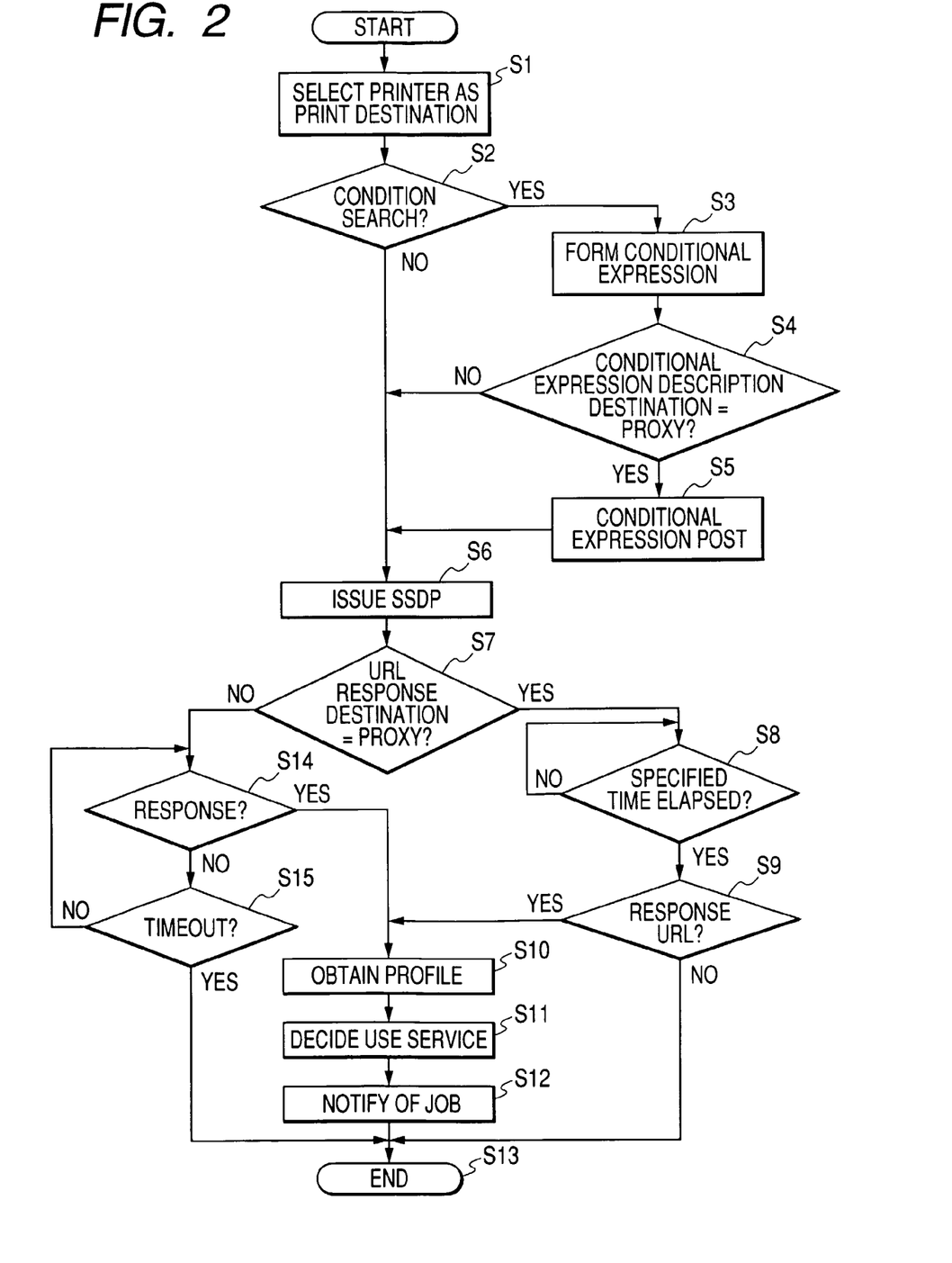
FIG. 2 is a flowchart showing a flow for processes of a client device 100 in the print service providing system shown in FIG. 1.

A flow of processes in the print service providing system shown in FIG. 1 will now be described. FIG. 2 is a flowchart showing a flow for processes of the client device 100 in the print service providing system shown in FIG. 1. Before printing a document formed by the application processing unit 4 (word processor), the client device 100 searches for the UPnP (registered trademark) corresponding printer existing on the network 20 (step S1).

Figure 3:
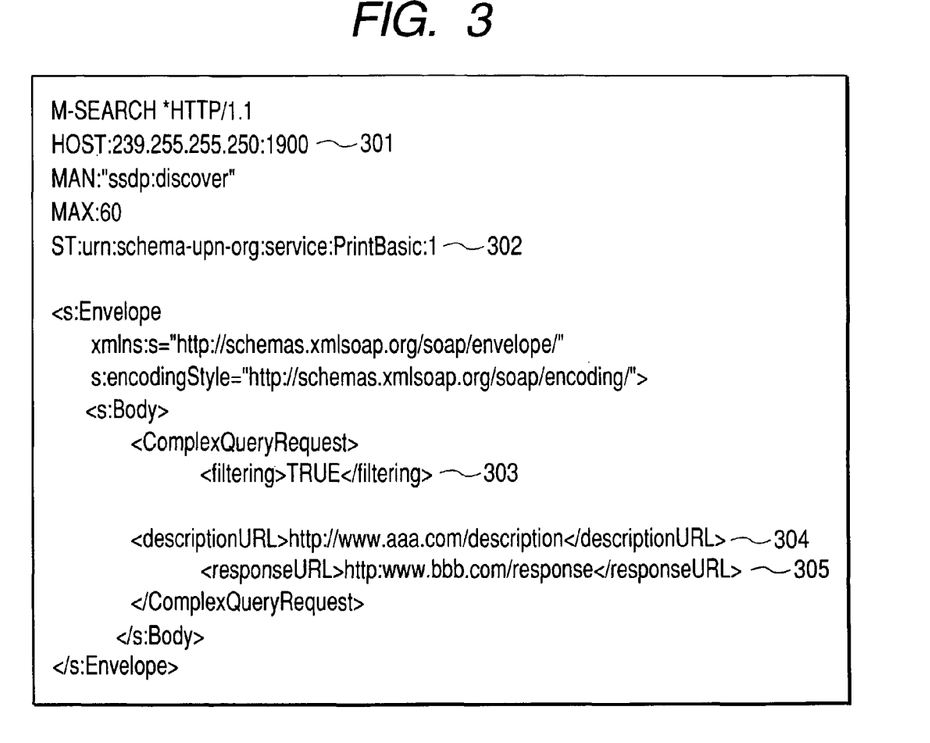
FIG. 3 is a diagram showing an example of an HTTP request for searching for a UPnP (registered trademark) corresponding printer existing on a network 20 in the embodiment of FIG. 1.

At this time, as a searching protocol, the client device 100 uses the SSDP (Simple Service Discovery Protocol) specified by UPnP (registered trademark) Architecture 1.0. FIG. 3 is a diagram showing an example of an HTTP request for searching for a UPnP (registered trademark) corresponding printer existing on the network 20 in the embodiment of FIG. 1. As shown in row 301 in FIG. 3, the HTTP request having the format shown in FIG. 3 is issued to, for example, a multicast address 239.255.255.250 and a port number 1900. As shown in row 302 in FIG. 3, "Print" is designated in an ST (Service Type) header, thereby notifying that the HTTP request is a request to search for print service.

In the present embodiment, as shown in FIG. 3, the SOAP (Simple Object Access Protocol) is used as an entity body of the HTTP request and the details of the searching condition are communicated to the recipients upon issuing of the request, so that another condition can be further added to the service designated by the ST header. Specifically speaking, the following SOAP function is defined in accordance with the format specified by the SOAP:

ComplexQueryRequest (filtering, descriptionURL, responseURL)

The above SOAP function realizes a function of notifying of the various conditions of the condition search. For example, "filtering" shown in row 303 is a flag indicative of the presence or absence of execution of the condition search and is set to either a value of "TRUE" or a value of "FALSE". In the case of TRUE, the condition search is executed. In the case of FALSE, the condition search is not executed.

In "descriptionURL" shown in row 304, when the filtering flag is TRUE, a description destination of the conditional expression of the condition search is shown in the format of the URL. In the present embodiment, as shown in FIG. 3, in order to obtain the conditional expression, the service providing apparatus corresponding to a service name described in the ST header mentioned above accesses the URL described as contents of "descriptionURL". However, by recording a recording destination of the conditional expression at a third network corresponding information processing apparatus (proxy processing server 300 in the present embodiment), a large number of accesses to the client device 100 from an unspecified large number of service providing apparatuses (printer 200 and the like) can be avoided.

In "responseURL", shown in row 305, the network-corresponding device which can provide services and satisfies the conditions designated by the condition search notifies the URL of its own network address in the format of the URL.

In the present embodiment, similarly, the third network-corresponding information processing apparatus can be designated as a response destination of the service providing apparatus which has made a response, and so accesses to the client device from an unspecified large number of service providing apparatuses can be avoided. In this case, the URL of the third network-corresponding information processing apparatus is described as contents of the descriptionURL element of the ComplexQueryRequest function.

In the case of executing the condition search, in the present embodiment, the client device 100 forms a conditional expression described in XML, records the conditional expression into the recording apparatus through the OS, and describes the recording destination as a URL into "descriptionURL" of the ComplexQueryRequest function.

Figure 4:
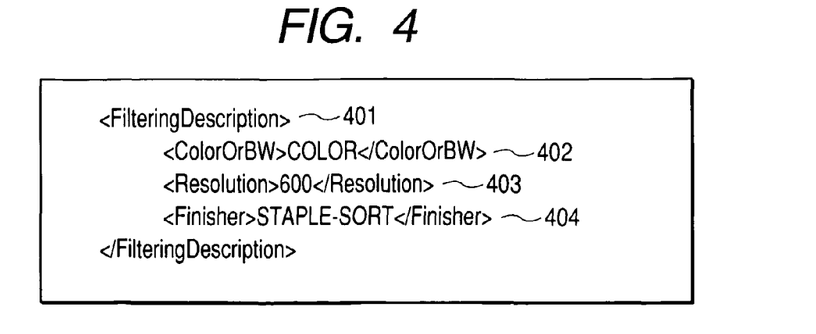
FIG. 4 is a diagram showing an example of description of searching conditional expressions in the embodiment of FIG. 1.

Subsequently, in the case of notifying of the detailed information of the searching condition (YES in step S2), the client device 100 forms a conditional expression describing the detailed information (step S3). FIG. 4 is a diagram showing an example of description of the searching conditional expressions. As shown in FIG. 4, the conditional expressions in this embodiment are described in XML.

The AND of the items described as contents of a "FilteringDescription" tag shown in row 401 in FIG. 4 becomes the searching condition. That is, in the case of the example shown in FIG. 4, a condition in which the color printing is possible is set in row 402, a condition in which the resolution is equal to or more than 600 dpi is set in row 403, and a condition in which the printer has a stapler (stapling function) as a finisher function is set in row 404.

In the case of recording the conditional expressions into the proxy processing server 300 instead of the recording apparatus of the client device 100 (YES in step S4), the client device 100 transmits the formed conditional expressions to the proxy processing server 300 by using an HTTP-POST request (step S5). At this time, a transmission destination URL is described as the contents of the descriptionURL element of the ComplexQueryRequest function. Thus, the proxy processing server 300 records the received conditional expressions into the recording apparatus through the memory processing unit 12.

Subsequently, in the case of recording the conditional expressions into the recording apparatus of the client device 100 (NO in step S4), the client device 100 describes a recording destination URL as contents of the descriptionURL element of the ComplexQueryRequest function. When the foregoing processes are completed, the client device 100 sends an SSDP packet onto the network 20 (step S6). When the process of step S4 mentioned above is executed, the client device 100 executes a process to select either a mode in which the response URL is set to the network address of the client device 100 itself or a mode in which it is set to the proxy processing server 300.

Thus, the printer 200 receives the SSDP packet through the network 20. The explanation of FIG. 2 is temporarily interrupted and the operation of the printer 200 which received the SSDP packet will now be described with reference to FIG. 5.

Figure 5:
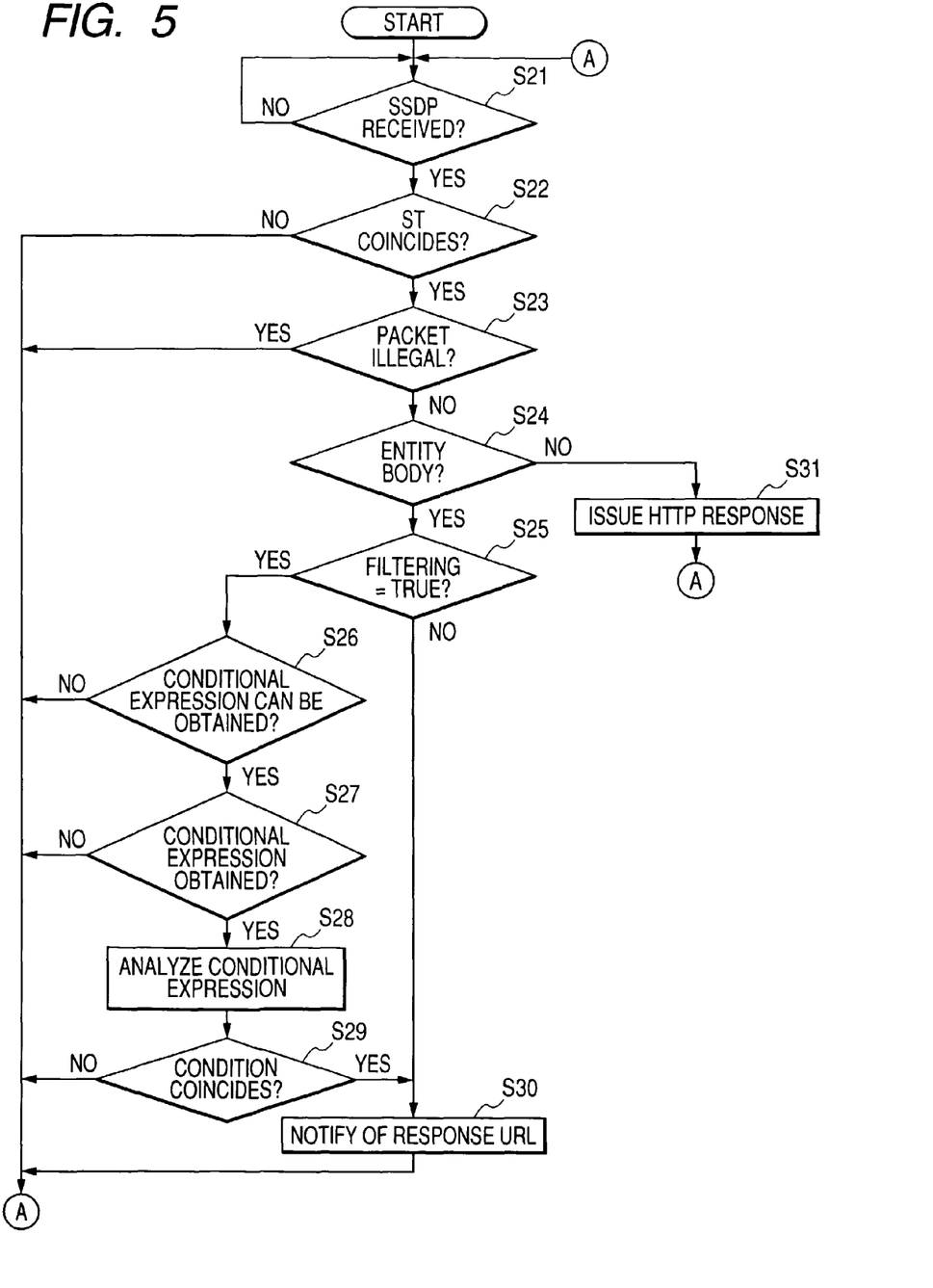
FIG. 5 is a flowchart showing the operation of a printer 200 shown in FIG. 1.

FIG. 5 is a flowchart showing the operation of the printer 200 shown in FIG. 1. As shown in FIG. 5, when the HTTP request (SSDP issued in step S6 in FIG. 2) is received (YES in step S21), the printer 200 analyzes the ST (Service Type) header of the HTTP request (step S22). If it is analyzed in the ST header that it indicates an ST designation other than "Print" (NO in step S22), the printer 200 interrupts the processing routine, does not issue a response to the HTTP request, and returns to step S21. If it is analyzed in the ST header that it indicates the ST designation of "Print" (YES in step S22), the printer 200 discriminates about the possible presence of any illegality in the packet contents (step S23).

If it is determined here that the packet contents are illegal (YES in step S23), the printer 200 interrupts the processing routine in a manner similar to the case of NO in step S22 and returns to step S21. If it is determined here that the packet contents are not illegal (NO in step S23), the printer 200 executes the analysis of the entity body of the HTTP request (step S24).

If it is analyzed here that there is no entity body (it is analyzed that there is no description regarding=ComplexQueryRequest) (NO in step S24), the printer 200 returns the HTTP response by unicast to the URL described in the header of the SSDP request (step S31) and returns to step S21.

If it is analyzed that the entity body exists (it is analyzed that the description regarding=ComplexQueryRequest exists) (YES in step S24), the printer 200 analyzes whether or not the filtering flag is FALSE (step S25). If it is analyzed here that the filtering flag is FALSE (NO in step S25), the printer 200 notifies the response destination URL described as "responseURL" contents of its own network address in the format of the URL (step S30).

Figure 6:
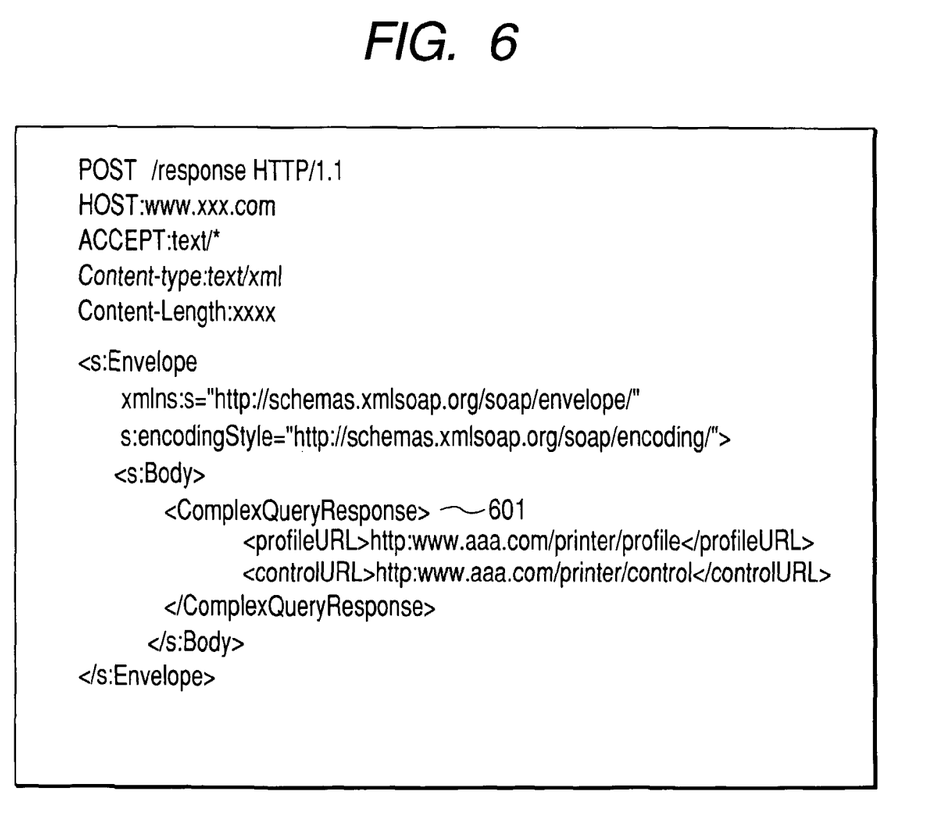
FIG. 6 is a diagram showing an example of a format of information which is used for the printer 200 to notify of its own network address.

An example of the format of the information which is communicated by the printer 200 will now be described. FIG.

6 is a diagram showing the example of the format of the information which is used for the printer 200 to notify of its own network address. As shown in FIG. 6, the SOAP is used as an entity body of the HTTP POST and the following SOAP function is defined in row 601:

ComplexQueryResponse (profileURL, controlURL)

The SOAP function realizes the function of communicating the response information by the network corresponding printer such as a printer 200 connected to the network 20 corresponding to the conditions of the condition search.

In "profileURL", the recording destination of a document describing the details of attribute information of the printer 200 (network corresponding printer) is shown by the URL. In "controlURL", the transmission destination of job data to the printer 200 (network corresponding printer) is shown by the URL.

Explanation is now returned to step S25 in FIG. 5.

"filtering" which is discriminated by the printer 200 in step S25 is the flag indicative of the presence or absence of the execution of the condition search and is set to either the value of "TRUE" or the value of "FALSE". In the case of TRUE, the condition search is executed. In the case of FALSE, the condition search is not executed. If the filtering flag is TRUE (YES in step S25), the printer 200 discriminates whether or not the device side can execute the analyzing process of the searching expression (step S26). If it is determined here that the device side cannot execute the analyzing process of the searching expression (NO in step S26), the printer 200 does not issue a response to the SSDP request and returns to step S21.

If it is determined that the device side can execute the analyzing process of the searching expression (YES in step S26), the printer 200 issues HTTP GET to the URL described in "descriptionURL" and obtains the conditional expression of the condition search. Thus, the client device 100 or the proxy processing server 300 which received the HTTP GET request from the printer 200 returns the conditional expression recorded in the designated URL to the printer 200. Thus, the printer 200 receives the conditional expression. In step S27, the printer 200 discriminates whether or not it has received the conditional expression from the client device 100. If the printer 200 fails in obtainment of the conditional expression (NO in step S27), the printer 200 interrupts the processing routine, does not issue a response to the SSDP request, and returns to step S21.

If the conditional expression could normally been obtained (YES in step S27), the printer 200 analyzes the contents of the conditional expression (step S28). If it is determined by the analysis that the condition described in the conditional expression coincides with the contents of the service provided by the printer 200 itself (YES in step S29), the printer 200 notifies the response destination described in "responseURL" of its network address in the format of the URL (step S30). At this time, the printer 200 issues "ComplexQueryResponse" and notifies the system of the response information.

If it is determined that the condition described in the conditional expression does not coincide with the contents of the service provided by the printer 200 itself (NO in step S29), the printer 200 does not issue a response to the SSDP request and returns to step S21. As mentioned above, if the printer 200 itself has the function according to the conditional expression, the printer 200 can return this fact according to a response request (issuance of the SSDP) including the conditional expression received from the client device 100.

The explanation is now returned to FIG. 2. That is, processes which are executed after the client device 100 issues the SSDP packet in step S6 will now be described. After step S6, the client device 100 discriminates whether or not the transmission destination of the response URL has been designated to the proxy processing server 300 (step S7). If the transmission destination of the response URL has been designated to the proxy processing server 300 here (YES in step S7), the client device 100 discriminates whether or not a predetermined time has elapsed (step S8). In the present embodiment, it is assumed that the predetermined time has been set to 30 seconds.

If it is decided here that the predetermined time has elapsed (YES in step S8), the client device 100 accesses the set response URL and discriminates about the presence or absence of the response information (step S9). If it is decided here that there is no response (NO in step S9), since this means that no device which can provide the condition-designated service exists, the client device 100 finishes the processing routine (step S13).

If it is determined that the response has been made (YES in step S9), the client device 100 determines that a device which can provide the condition-designated service exists, and executes the following processes of steps S10 to S12. Particularly, if there are a plurality of responses in step S9, in order to decide which service is to be used, the client device 100 issues HTTP GET to "profileURL" as one of the arguments of "ComplexQueryResponse" as necessary and obtains profile information of the devices which have made a response (including the printer 200) (step S10). Subsequently, the client device 100 selects the optimum network-corresponding printer on the basis of the obtained profile information (step S11). When the network-corresponding printer to be used (assumed to be the printer 200 here) is determined, the client device 100 sends a print job to "controlURL" as one of the arguments of "ComplexQueryResponse" corresponding to the response from the printer 200 and executes printing of the formed document (step S12).

When the response URL is assumed to be the network address of the client device 100 itself (NO in step S7), the client device 100 discriminates whether or not there is a response to the response URL. If it is determined that a response exists (YES in step S14), the client device 100 determines that a device which can provide the condition-designated service exists, and executes the processes of steps S10 to S12 mentioned above.

If there is no response in step S14 (NO in step S14), the client device 100 discriminates whether or not a predetermined time has elapsed (step S15). In the present embodiment, the predetermined time is set to 30 seconds. If it is decided that the predetermined time has not elapsed (NO in step S15), the processing routine is returned to step S14. If it is decided that the predetermined time has elapsed (YES in step S15), the client device 100 decides that no device which can provide the condition-designated service exists on the network 20. Step S13 follows and the processing routine is finished.

As mentioned above, the client device 100 in the present embodiment broadcasts a response request including the conditional expression described in XML to the network 20, so that it can search for a network-corresponding printer which satisfies the conditional expression and transmit the print job to the searched printer.

Other Embodiments

Although the invention is realized by using the SSDP specified by UPnP v1 as a protocol of the service search (search for the network device) and adding the searching condition to the protocol in the foregoing embodiment, the invention is not limited to this arrangement. As a service searching protocol, various protocols can be applied so long as the protocol can add the searching condition.

Although the conditional expression for the condition search is described in the format of the XML in the foregoing embodiment, the describing format is not limited to use of the Markup language such as XML but a CSV (Comma Separated Value), a simple text, or a binary description can be also used.

Although the description of only the logical relation AND has been mentioned as an example in the description of the conditional expression in the foregoing embodiment, OR, or combinations of AND and OR, can also be used.

Although the conditional expression for the condition search is described in the format of the XML in the foregoing embodiment, it is also possible to use "XPath" as a describing format and specify the service.

Although the registration and obtaining of the conditional expression for the condition search by HTTP POST/GET and the recording and obtaining of the response information are executed in the foregoing embodiment, they can be also realized by using another protocol such as FTP or the like.

As described above, according to the service providing system through the network in the foregoing embodiment, when the job is executed, the client device 100 searches for the service providing apparatus (printer 200) which provides the service requested by the job. Therefore, the searching conditional expression for the condition search is recorded into the recording apparatus which is managed by the client device 100 itself or into the recording apparatus which is managed by a third information processing apparatus (proxy processing server 300). Further, also with respect to the response information of the service providing apparatus which satisfies the condition search, the service providing system has a function of recording such information into the recording apparatus which is managed by the client device 100 itself or into the recording apparatus which is managed by the third information processing apparatus (proxy processing server 300). Thus, as compared with the searching method of the conventional service providing apparatus, in which the client device adds the searching conditional expression to the search packet which is transmitted to the network, according to the foregoing embodiment, since the searching conditional expression is not added to the search packet (instead, a recording location of the searching conditional expression is communicated to the recipients), the communication load of the network can be remarkably reduced. Moreover, with respect to the obtainment of the searching conditional expression, since the service providing apparatus can execute it by the judgment of the service providing apparatus on the basis of the received search packet, it is possible to prevent a large number of search packets from being received from malicious client devices. The security performance and the stability of the system can be improved.

The recording of the searching conditional expression can be designated as a recording destination of the recording apparatus of the third information processing apparatus (proxy processing server 300), and unnecessary accesses from malicious devices can be avoided. Similarly, as a notification destination of the response information from the service providing apparatus, the recording apparatus of the third information processing apparatus can be designated as a recording destination and again unnecessary accesses from malicious devices can be avoided. Further, the client device 100 can avoid the transmission of search packets having a large data amount to low-end service providing apparatuses which cannot cope with such a condition search. The service searching process according to the processing ability of the service providing apparatus can be realized.

According to the processing functions of the client device 100 and the printer 200 in the foregoing embodiment, a program to realize the processing functions is read out from the memory and a CPU (central processing unit) executes it, thereby realizing those functions. However, the invention is not limited to such a construction, but all or a part of the processing functions can be also realized by dedicated hardware. The memory can be constructed by any one of a magnetooptic disk device, a non-volatile memory such as a flash memory, a read only recording medium such as a CD-ROM, a volatile memory other than a RAM, and a computer-readable/writable recording medium comprising a combination of them.

The processes can be also executed by a method whereby programs to realize the functions in the client device 100 and the printer 200 are recorded in the computer-readable recording medium, and the programs recorded in the recording medium are read out and executed by a computer system. It is assumed that the "computer system" used here includes the OS and hardware such as peripheral devices and the like. Specifically speaking, the invention also incorporates the case where a program read out from a storing medium is written into a memory provided for a function expanding board inserted in a computer or a function expanding unit connected to the computer, after that, a CPU or the like provided for the function expanding board or the function expanding unit executes a part or all of actual processes on the basis of instructions of the program, and the functions of the embodiment mentioned above are realized by those processes.

It is assumed that the "computer-readable recording medium" denotes a portable medium such as flexible disk, magnetooptic disk, ROM, CD-ROM, or the like or a storing device such as a hard disk or the like built in the computer system. Further, it is assumed that the "computer-readable recording medium" incorporates a medium which holds the program for a predetermined time, such as a volatile memory (RAM) in the computer system serving as a server or a client in the case where the program has been transmitted through a network such as Internet or the like or through a communicating circuit such as a telephone line or the like.

The program can be transmitted from the computer system in which the program has been stored in a storing device or the like to another computer system through a transmitting medium or by a transmission wave in the transmitting medium. The "transmitting medium" to transmit the program denotes a medium having a function of transmitting information like a network (communicating network) such as Internet or the like or a communicating circuit (communicating line) such as a telephone line or the like.

The program can be a program for realizing a part of the foregoing functions. Further, the program can be realized by combining the foregoing functions with the program which has already been recorded in the computer system, that is, it can be what is called a differential file (differential program).

A program product such as a computer-readable recording medium or the like in which the program has been recorded can be also applied as an embodiment of the invention. The program, recording medium, transmitting medium, and program product mentioned above are also incorporated in the purview of the invention.

Although the embodiment of the invention has been described in detail above with reference to the drawings, the specific construction is not limited to the embodiment but a design and the like in the scope are also incorporated without departing from the spirit of the invention.

This application claims priority from Japanese Patent Application No. 2004-174521 filed on Jun. 11, 2004, which is hereby incorporated by reference herein.

The invention claimed is:

1. A service providing system comprising one or a plurality of client apparatuses and a plurality of printers which provide services to the client apparatus(es),
wherein each said client apparatus comprises:
a notifying unit configured to notify the plurality of printers of a request which includes location information indicating where search condition information associated with a request for a service is stored through a network, wherein the request does not include the search condition information;
a selecting unit configured to select one of the printers that provide the service on the basis of response information which is outputted by the printers as a result of processing, by the printers, of the request; and
a sending unit configured to send a print job to the printer selected by said selecting unit, and
wherein each said printer comprises:
an obtaining unit configured to obtain the search condition information based on the location information included in the request from the client apparatus; and
a response unit configured to output the response information on the basis of whether or not the service corresponding to the search condition information obtained by said obtaining unit can be provided.

2. A service providing apparatus comprising:
an obtaining unit configured to obtain a request which includes location information from a client apparatus, the location information indicating where specific search condition information associated with a request for service is stored, and to obtain the search condition information based on the location information included in the obtained request; and
a response unit configured to output response information on the basis of whether or not the service corresponding to the search condition information obtained by said obtaining unit can be provided,
wherein the obtained request does not include the search condition information, and
wherein said service providing apparatus further comprises at least a processor and computer memory that serve as said obtaining unit and said response unit.

3. An apparatus according to claim 2, wherein the service corresponding to the search condition information is a service which is requested by a job when the client apparatus executes the job.

4. An apparatus according to claim 2, wherein
the search condition information includes at least first information showing an outline of the service and second information to specify details of the service, and
said response unit responds on the basis of whether or not the service consistent with the first information and the second information included in the search condition information can be provided.

5. An apparatus according to claim 2, wherein said obtaining unit obtains search condition information stored in said client apparatus or in an external server on the basis of the location information.

6. An apparatus according to claim 5, wherein said response unit outputs the response information when the service according to the service information can be provided.

7. An apparatus according to claim 2, wherein
the search condition information includes at least first information showing an outline of the service, and
said response unit outputs the response information on the basis of whether or not the service consistent with the first information included in the search condition information can be provided.

8. An apparatus according to claim 4, wherein the search condition information includes the second information, and when said response unit of the service providing apparatus does not have a function of discriminating whether or not the service can be provided on the basis of the second information, said response unit does not output the response information.

9. A client apparatus for communicating with a plurality of service providing apparatuses, comprising:
a notifying unit configured to notify the plurality of service providing apparatuses of a request which includes location information indicating where search condition information associated with a request for a service is stored through a network;
a selecting unit configured to select one of the service providing apparatuses that provide the service on the basis of response information which is outputted by the service providing apparatuses as a result of processing, by the service providing apparatuses, of the request; and
a sending unit configured to send a print job to the service providing apparatus selected by said selecting unit,
wherein the request does not include the search condition information, and
wherein said service providing apparatus further comprises at least a processor and computer memory that serve as said notifying unit, said selecting unit and said sending unit.

10. A control method of a service providing apparatus, comprising:
an obtaining step of
obtaining a request which includes location information from a client apparatus, the location information indicating where specific search condition information associated with a request for a service is stored, and
obtaining the search condition information based on the location information included in the obtained request; and
a response step of outputting response information on the basis of whether or not the service corresponding to the search condition information obtained in said obtaining step can be provided,
wherein the obtained request does not include the search condition information.

11. A method according to claim 10, wherein the service corresponding to the search condition information is a service which is requested by a job when said client apparatus executes the job.

12. A method according to claim 10, wherein
the search condition information includes at least first information showing an outline of said service to be used in said client device and second information to specify details of the service, and
in said response step, the response is made on the basis of whether or not the service consistent with the first information and the second information included in the search condition information can be provided.

13. A method according to claim 10, wherein, in said obtaining step, search condition information stored in the client device or in an external server is obtained on the basis of the location information.

14. A method according to claim 13, wherein, in said response step of the service providing apparatus, the response information is outputted when the service according to the service information can be provided.

15. A method according to claim 10, wherein the search condition information includes at least first information showing an outline of the service, and in said response step, the response information is outputted on the basis of whether or not the service consistent with the first information included in the search condition information can be provided.

16. A method according to claim 12, wherein the search condition information includes the second information, and when said response step of the service providing apparatus does not have a function of discriminating whether or not the service can be provided on the basis of the second information, in said response step, the response information is not outputted.

17. A control method of a client apparatus which communicates with a service providing apparatus, comprising the steps of:

a notifying step of notifying a plurality of service providing apparatuses of a request which includes location information indicating where specific search condition information associated with a request for a service is stored through a network;

a selecting step of selecting one of the service providing apparatuses that provide the service on the basis of response information which is outputted by the service providing apparatuses as a result of processing, by the service providing apparatuses, of the request; and a sending step of sending a print job to the service providing apparatus selected in said selecting step, wherein the request does not include the search condition information.

18. A non-transitory computer-readable storage medium storing a program for causing a computer to perform a control method of a service providing apparatus, the method comprising:

an obtaining step of obtaining a request which includes location information from a client apparatus, the location information indicating where specific search condition information associated with a request for a service is stored, and obtaining the search condition information based on the location information included in the obtained request; and a response step of outputting response information on the basis of whether or not the service corresponding to the search condition information obtained in said obtaining step can be provided, wherein the obtained request does not include the search condition information.

19. A non-transitory computer-readable storage medium storing a program for causing a computer to perform a control method of a client apparatus which communicates with a service providing apparatus, the method comprising the steps of:

a notifying step of notifying a plurality of service providing apparatuses of a request which includes location information indicating where specific search condition information associated with a request for a service is stored through a network;

a selecting step of selecting one of the service providing apparatuses that provide the service on the basis of response information which is outputted by the service providing apparatuses as a result of processing, by the service providing apparatuses, of the request; and a sending step of sending a print job to the service providing apparatus selected in said selecting step, wherein the request does not include the search condition information.

* * * * *